(12) United States Patent
Yonekura

(10) Patent No.: US 12,385,845 B2
(45) Date of Patent: Aug. 12, 2025

(54) OPTICAL MEASUREMENT DEVICE AND LIQUID CHROMATOGRAPH SYSTEM

(71) Applicant: SHIMADZU CORPORATION, Kyoto (JP)

(72) Inventor: Takuya Yonekura, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 121 days.

(21) Appl. No.: 18/402,348

(22) Filed: Jan. 2, 2024

(65) Prior Publication Data
US 2024/0241062 A1  Jul. 18, 2024

(30) Foreign Application Priority Data
Jan. 17, 2023 (JP) ................. 2023-004981

(51) Int. Cl.
*G01N 21/85* (2006.01)
*G01N 21/05* (2006.01)

(52) U.S. Cl.
CPC ............. *G01N 21/85* (2013.01); *G01N 21/05* (2013.01)

(58) Field of Classification Search
CPC ...... G01N 21/85; G01N 21/05; G01N 21/274; G01N 21/31; G01N 30/74; G01R 19/00; G05D 23/19
USPC ........................................... 356/246
See application file for complete search history.

(56) References Cited

U.S. PATENT DOCUMENTS

| 7,113,282 B2 * | 9/2006 | Aguirre ............... G01J 1/20 356/418 |
| 2007/0057159 A1 * | 3/2007 | Hing ............... G01J 3/2803 250/214 R |

FOREIGN PATENT DOCUMENTS

JP     2019-184458 A    10/2019

* cited by examiner

*Primary Examiner* — Md M Rahman
(74) *Attorney, Agent, or Firm* — Renner, Otto, Boisselle & Sklar, LLP

(57) ABSTRACT

An optical part (2) including a measurement cell (12), a light source part (10) that emits light to be emitted to the measurement cell (12), a light receiving element (14), and a shutter (18) that shields light to the light receiving element (14), a storage part (6), a controller (4), and a calculator (8). The optical part (2) includes a temperature control element (26) for adjusting a temperature of the optical part (2), the controller (4) is configured to control the temperature control element (26) so that a temperature of the optical part (2) becomes a target temperature which is set in advance, and to execute, at least in a case where a measured value of the dark current at the target temperature is not stored in the storage part (6), measurement of the dark current immediately after a transition from an unstable state to a stable state, the storage part (6) stores a measured value of the dark current acquired in the measurement, and the calculator is configured to continuously use a same measured value of the dark current in the calculation processing while the stable state of the temperature of the optical part continues.

8 Claims, 4 Drawing Sheets

OPTICAL MEASUREMENT DEVICE AND LIQUID CHROMATOGRAPH SYSTEM

BACKGROUND OF THE INVENTION

1. Field of the Invention

The present invention relates to an optical measurement device and a liquid chromatograph system.

2. Description of the Related Art

As a detector for a liquid chromatograph, an optical measurement device such as an absorbance detector that measures absorbance is known (see, for example, JP 2019-184458 A). An optical measurement device such as an absorbance detector includes a measurement cell in which a sample flows, a light source that emits light toward the measurement cell, and a light receiving element such as a photodiode array (hereinafter, PDA) that receives light passing through the measurement cell and outputs current having a magnitude corresponding to intensity of received light.

In a light receiving element such as a PDA, a small amount of current (dark current) flows without receiving of light. For this reason, in order to accurately measure absorbance, it is ideal to subtract a value of dark current at the time of measurement from a value of current output from a light receiving element at the time of measurement. However, since it is impossible to measure dark current during measurement, dark current has been measured immediately before measurement is started and used as dark current during the measurement.

For example, in a case where an autosampler is included in a configuration of a liquid chromatograph and operation of the autosampler and a detector are managed in a unified manner, dark current immediately before start of analysis can be measured while preliminary operation such as cleaning of a needle and collection of a sample from a sample vial by a needle is performed in the autosampler. On the other hand, in a case where no autosampler is included in a configuration of a liquid chromatograph or in a case where operation of an autosampler and a detector cannot be managed in a unified manner, it has been necessary to measure dark current immediately after analysis is started in order to acquire dark current immediately before start of absorbance measurement.

SUMMARY OF THE INVENTION

Operation speed of an autosampler is improved each time a new product is developed. As it takes about seven seconds to measure dark current of a detector, if time required for preliminary operation is shortened due to improvement in operation speed of an autosampler, in the future, it is conceivable that measurement of dark current will not be finished by the time preliminary operation of the autosampler is completed when measurement of dark current is executed during the preliminary operation. Then, if an attempt is made to acquire dark current immediately before analysis is started, the analysis is started before measurement of dark current is completed, and there is a possibility that problems such as loss of analysis data at the beginning of the analysis are generated. Further, in a case where dark current is measured immediately after analysis is started, naturally, analysis data at the beginning of the analysis is lost.

The present invention has been made in view of the above problem, and an object of the present invention is to provide an optical measurement device capable of preventing loss of analysis data at the beginning of analysis due to measurement of dark current.

Dark current of a light receiving element such as a PDA has a positive linear relationship with respect to temperature. For this reason, when a temperature of a light receiving element changes, a value of dark current also changes. However, in a case where a light receiving element is accommodated in a common housing together with another optical system such as a light source and temperature adjustment is performed, a temperature of the light receiving element does not greatly change except in a case where a target temperature of temperature control is changed. When a temperature of an optical system is adjusted, a temperature of the optical system may slightly fluctuate due to a change in an environmental temperature or the like, but a range of such fluctuation is about a target temperature±1° C. In a case where a temperature of a PDA fluctuates by 1° C., dark current fluctuates by about 6.60 (AD value), but the fluctuation of dark current to this extent is extremely small as compared with a measured value of absorbance, and is considered to have little influence on an analysis result. In view of the above, in the present invention, on the premise that temperature adjustment of an optical part including a light receiving element is performed, while fluctuation of a dark current value due to influence of temperature fluctuation within a range in which temperature of the optical part can be said to be stable is allowed, necessity of performing measurement of dark current immediately before start of analysis or immediately after start of analysis is eliminated every time the analysis is performed.

That is, an optical measurement device according to the present invention includes an optical part including a measurement cell, a light source part that emits light to be emitted to the measurement cell, a light receiving element that receives light out from the measurement cell and outputs current according to intensity of received light, and a shutter that shields light to the light receiving element, a storage part that stores a measured value of dark current of the light receiving element of the optical part, a controller for controlling operation of the optical part, and a calculator that performs calculation processing of obtaining a current value based on intensity of light received by the light receiving element by subtracting a measured value of the dark current stored in the storage part from a value of current output from the light receiving element during analysis. The optical part includes a temperature control element for adjusting a temperature of the optical part, the controller is configured to control the temperature control element so that the temperature of the optical part becomes a target temperature which is set in advance, and to execute, at least in a case where a measured value of the dark current at the target temperature is not stored in the storage part, measurement of the dark current by closing the shutter immediately after a transition from an unstable state to a stable state, the unstable state is a state in which a temperature of the optical part fluctuates, the stable state is a state in which a temperature of the optical part is stable at the target temperature, the storage part is configured to store a measured value of the dark current acquired in the measurement, and the calculator is configured to continuously use a same measured value of the dark current in the calculation processing while the stable state of a temperature of the optical part continues.

Further, a liquid chromatograph system according to the present invention includes a liquid chromatograph including the optical measurement device described above and a system controller that controls the liquid chromatograph. The system controller is configured to set an analysis condition for each of a plurality of analyses and to continuously execute a plurality of the analyses under the analysis condition set for each of the analyses after measurement of the dark current in the optical measurement device is finished, and the calculator of the optical measurement device is configured to continuously use the same measured value of the dark current in the calculation processing as long as the stable state of a temperature of the optical part continues during execution of a plurality of the analyses.

In the optical measurement device according to the present invention, immediately after a temperature of the optical part makes a transition from a fluctuation state to a stable state, at least in a case where a measured value of the dark current at the target temperature is not stored in the storage part, the shutter is closed and measurement of the dark current is executed. After that, as long as the stable state of the optical part continues, the same measured value of the dark current is continuously used for calculation processing by the calculator. Therefore, in a case where a plurality of analyses are continuously executed, it is not necessary to perform measurement of dark current during preliminary operation of an autosampler before each analysis is started or immediately after start of each analysis. By the above, it is possible to prevent loss of analysis data at an initial stage of analysis.

Since the liquid chromatograph system according to the present invention includes the optical measurement device, in a case where a plurality of analyses are continuously executed, measurement of dark current is not performed during preliminary operation of an autosampler before each analysis is started or immediately after each analysis is started. By the above, loss of analysis data at the initial stage of analysis is prevented.

DETAILED DESCRIPTION OF THE INVENTION

Hereinafter, an embodiment of an optical measurement device and a liquid chromatograph system according to the present invention will be described with reference to the drawings.

Figure 1:
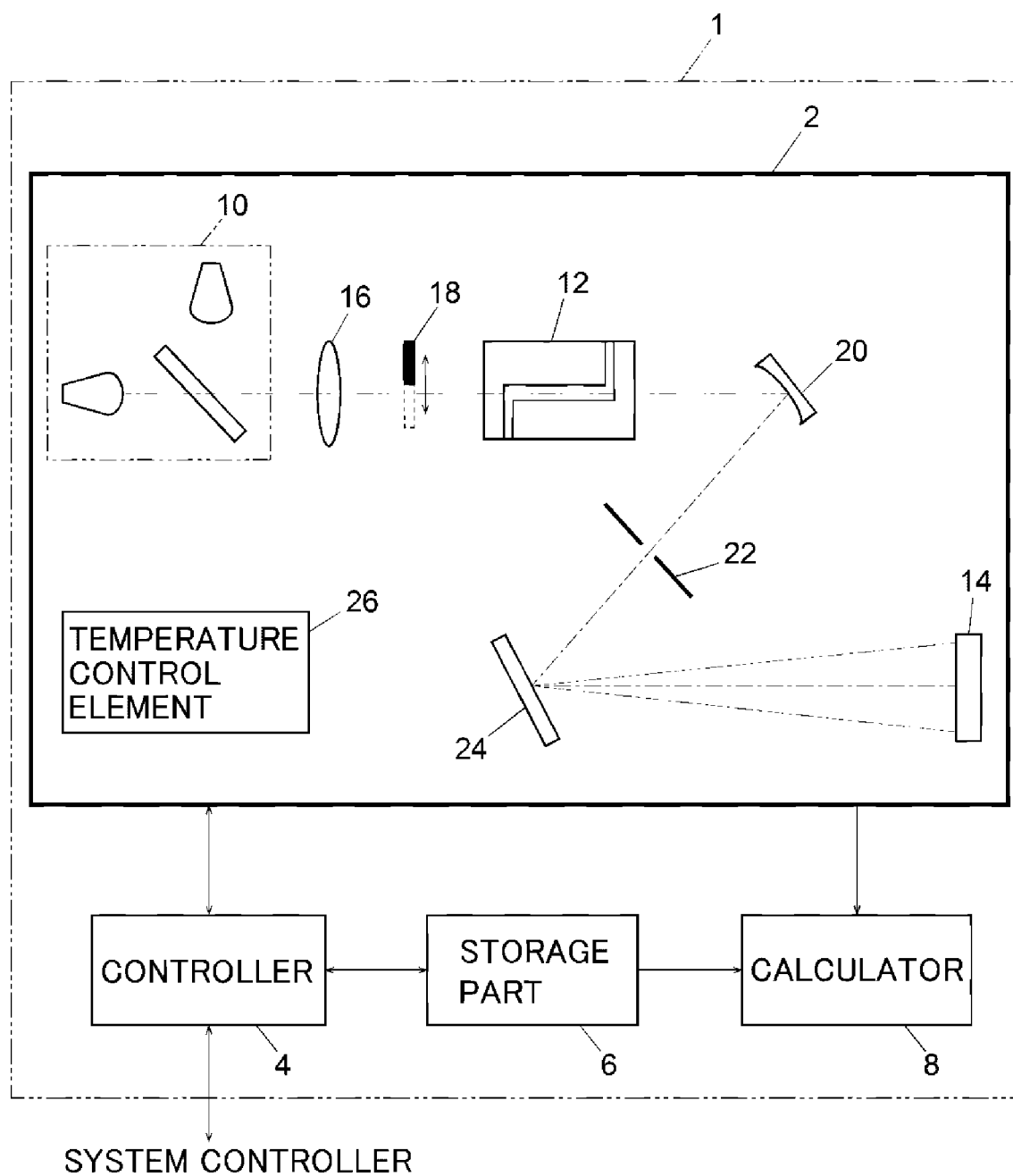
FIG. 1 is a schematic configuration diagram illustrating an embodiment of an optical measurement device.

First, an embodiment of the optical measurement device will be described. As illustrated in FIG. 1, an optical measurement device 1 is an absorbance detector, and includes a spectroscope 2 (optical part), a controller 4, a storage part 6, and a calculator 8.

The spectroscope 2 includes a light source part 10, a measurement cell 12, a PDA 14 (light receiving element), a lens 16, a shutter 18, a mirror 20, a slit 22, a grating 24, and a temperature control element 26 in a common housing.

The light source part 10 includes two light sources (for example, a D2 lamp and a tungsten lamp) that emit light having wavelengths different from each other, and turns on one of the light sources to irradiate the measurement cell 12 through which sample liquid flows with light. The lens 16 and the shutter 18 are arranged between the light source part 10 and the measurement cell 12. The shutter 18 opens and closes on an optical path of light from the light source part 10 toward the measurement cell 12. The mirror 20 is arranged to guide light transmitted through the measurement cell 12 to the grating 24. The slit 22 is provided between the mirror 20 and the grating 24. The grating 24 spectrally disperses transmitted light of the measurement cell 12 guided by the mirror 20 for each wavelength band and guides the light to the PDA 14. The PDA 14 receives light of each wavelength band from the grating 24. The temperature control element 26 is an element for adjusting a temperature of the spectroscope 2 to a set target temperature, and includes, for example, a heater, a fan, a temperature sensor, and the like.

The controller 4 controls operation of the light source part 10, the shutter 18, the temperature control element 26, and the like of the spectroscope 2. The controller 4 is a function realized by a computer circuit.

The storage part 6 stores dark current of the PDA 14. The storage part 6 is a function realized by a partial storage area of an information storage device such as a hard disk drive or a flash memory.

The calculator 8 performs calculation processing by using a signal obtained by the PDA 14. The calculator 8 is a function realized by a computer circuit.

The controller 4 and the calculator 8 may be realized by a common computer circuit or may be realized by another computer circuit.

The controller 4 communicates with a system controller 104 (see FIG. 3) that controls a liquid chromatograph 102 (see FIG. 3) in which the optical measurement device 1 is incorporated. Then, the controller 4 controls operation of the spectroscope 2 based on information given from the system controller 104. Information given from the system controller 104 includes a signal related to a light source (if light sources provided in the light source part 10 are a D2 lamp and a tungsten lamp, any of these light sources) to be used for measurement of absorbance, a signal instructing start of measurement, a signal instructing end of measurement, and the like.

In a case where continuous analysis of a plurality of analyses is performed in the liquid chromatograph 102 (see FIG. 3), an analysis method (analysis conditions such as a type of mobile phase, a flow rate, an oven temperature, and a type of light source used for absorbance measurement) is set in advance for each analysis, and information related to the optical measurement device 1 among setting items of the analysis method is given from the system controller 104 to the controller 4. The controller 4 turns on a light source to be used in next analysis according to the given information, and controls the temperature control element 26 so that a temperature of the spectroscope 2 becomes closer to a target temperature corresponding to the light source. The target temperature for temperature adjustment of the spectroscope 2 may be determined by the controller 4 in accordance with information prepared in advance when information regarding a type of light source to be used is given, or information regarding a target temperature itself may be given.

The controller 4 is configured to start temperature adjustment of the spectroscope 2 in accordance with information from the system controller 104, and execute measurement of dark current of the PDA 14 immediately after transition from an unstable state in which a temperature of the spectroscope 2 fluctuates toward a target temperature to a stable state in which the temperature of the spectroscope 2 is stable at the target temperature. Whether or not a temperature of the spectroscope 2 makes a transition from an unstable state to a stable state can be detected based on whether or not a temperature of the spectroscope 2 is continuously within a predetermined temperature range (for example, target temperature±1° C.) including a target temperature for a predetermined period of time. Measurement of dark current is performed by closing the shutter 18 to shield light from the light source part 10.

A measured value obtained by measurement of dark current is stored in the storage part 6. The calculator 8 subtracts a measured value of dark current stored in the storage part 6 from a value of current output from the PDA 14 by the calculator 8 during analysis, and uses the value obtained by subtracting the dark current as a signal value for absorbance calculation.

Here, the storage part 6 may store a measured value of dark current in association with a target temperature of the spectroscope 2. Since dark current depends on a temperature of the PDA 14, if a target temperature of temperature adjustment of the spectroscope 2 is the same, a dark current value when a temperature of the spectroscope 2 is stable is substantially the same. For this reason, if the storage part 6 stores a measured value of dark current in association with a target temperature of the spectroscope 2, a measured value of dark current acquired once can be used for analysis performed later using the same light source.

Figure 2:
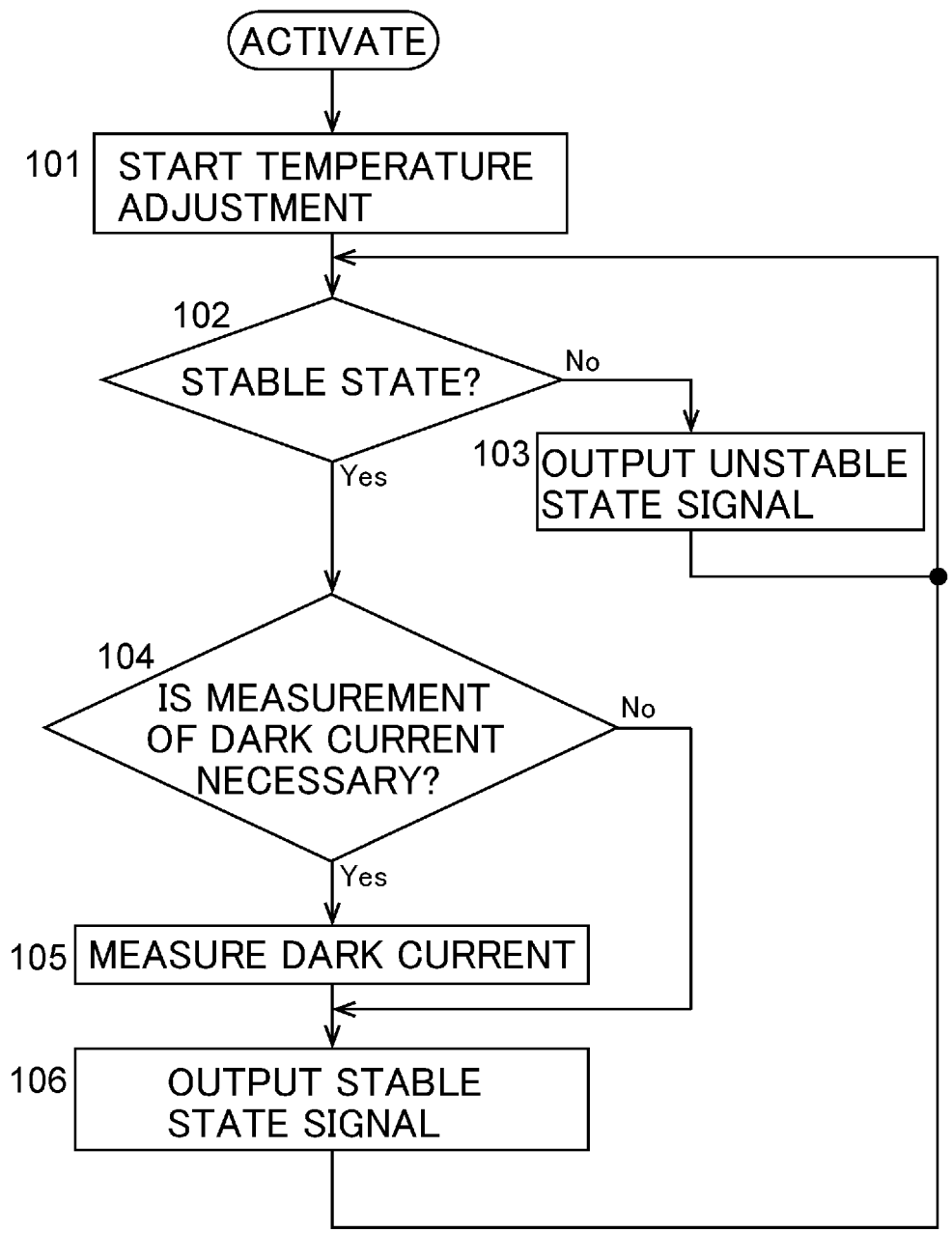
FIG. 2 is a flowchart illustrating an example of operation of the embodiment.

An example of operation of the optical measurement device 1 will be described with reference to a flowchart of FIG. 2 together with FIG. 1.

When the optical measurement device 1 is activated and information on a light source used for first analysis is given to the controller 4, a target temperature is determined, and the controller 4 controls the temperature control element 26 according to the target temperature to start temperature adjustment of the spectroscope 2 (Step 101). The controller 4 monitors a temperature of the spectroscope 2 and determines whether the spectroscope 2 is in a stable state or an unstable state (Step 102). While a temperature of the spectroscope 2 is in an unstable state (Step 102: No), the controller 4 outputs an unstable state signal to the system controller 104 until the temperature becomes in a stable state (Step 103).

After a temperature of the spectroscope 2 makes a transition to a stable state at a target temperature (Step 102: Yes), the controller 4 determines whether or not it is necessary to measure dark current (Step 104). Here, the controller 4 determines that measurement of dark current is necessary at least in a case where a measured value of dark current acquired when the spectroscope 2 is in a stable state at the target temperature is not stored in the storage part 6. For example, after the optical measurement device 1 is activated and before first analysis is performed, the storage part 6 does not store any information on a measured value of dark current, and thus the controller 4 determines that measurement of dark current is necessary. On the other hand, in a case where absorbance measurement using a light source used in next analysis is already performed in previous analysis after one or more times of analysis is performed, a measured value of dark current that can be used for the next analysis is stored in the storage part 6, and measurement of dark current can be determined to be unnecessary. At least in a case where a light source used for measurement of absorbance is not changed from previous analysis, a stable state of a temperature of the spectroscope 2 continues, and thus it is not necessary to measure dark current. By the above, in a case where continuous analysis of a plurality of analyses is performed, measurement of dark current is not performed immediately before each analysis or immediately after start of each analysis. On the other hand, if there is a change in a light source used for analysis after one or more times of analysis is performed, a target temperature of temperature adjustment of the spectroscope 2 is also changed. Therefore, a temperature of the spectroscope 2 fluctuates toward a new target temperature and becomes in an unstable state (Step 102: No), and it is determined again whether or not to measure dark current when transition is made to a stable state (Step 104).

In a case of determining that it is necessary to measure dark current in Step 104, the controller 4 shields light emitted from the light source part 10 with the shutter 18 of the spectroscope 2, and executes measurement of dark current of the PDA 14 (Step 105). A measured value of dark current acquired in the measurement is stored in the storage part 6. By the above, measurement preparation of the optical measurement device 1 is in a state of being completed. Also in a case where the controller 4 determines that measurement of dark current is unnecessary in Step 104, measurement preparation of the optical measurement device 1 is in a state of being completed. The controller 4 may be configured to transmit a stable state signal indicating that a temperature of the spectroscope 2 of the optical measurement device 1 becomes in a stable state to the system controller 104 (see FIG. 3) that controls the liquid chromatograph 102 including the optical measurement device 1. By the above, the system controller 104 can grasp whether or not the optical measurement device 1 is in a measurable state, and can transmit a command to start analysis to each device at an appropriate timing. After the above, when analysis is started, the optical measurement device 1 executes measurement of absorbance (Step 107).

Note that, in the above embodiment, when a temperature of the spectroscope 2 makes a transition from an unstable state to a stable state, it is determined whether or not to perform measurement of dark current. However, the configuration may be such that measurement of dark current is always performed immediately after a transition from an unstable state to a stable state without such determination.

Next, an embodiment of a liquid chromatograph system including the optical measurement device 1 will be described.

A liquid chromatograph system 100 includes the liquid chromatograph 102 and the system controller 104. The liquid chromatograph 102 includes a liquid feeding pump 106, an autosampler 108, and a column oven 110 in addition to the optical measurement device 1 described above. The system controller 104 is a function of controlling each constituent of the liquid chromatograph 102, and can be realized by a computer circuit.

Figure 3:
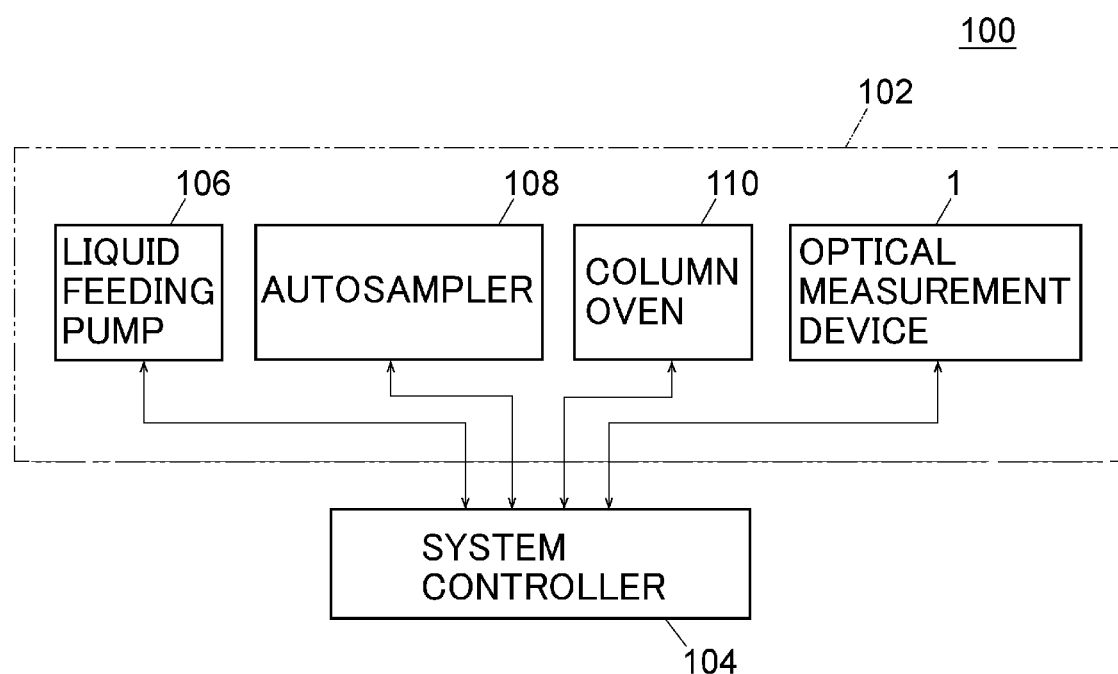
FIG. 3 is a block diagram illustrating an embodiment of a liquid chromatograph system.

Note that, in FIG. 3, the system controller 104 is described as an element completely separated from the optical measurement device 1, but may be realized by a computer circuit common to at least a part of the controller 104, the storage part 106, and the calculator 108 of the optical measurement device 1.

The system controller 104 is configured to set an analysis method for each of a plurality of analyses based on information input from the user, and to continuously execute a plurality of analyses according to the set analysis method after receiving an instruction to start analysis from the user.

Further, the system controller 104 communicates with each of the optical measurement device 1, the liquid feeding pump 106, the autosampler 108, and the column oven 110 to grasp whether or not each element is in a usable state, and, by that, monitors whether or not the liquid chromatograph 102 is in a state of being able to execute analysis. Whether or not the optical measurement device 1 is in a usable state is determined based on a type of state signal output from the controller 4 of the optical measurement device 1. If a state signal output from the controller 4 is an unstable state signal, the optical measurement device 1 is in an unusable state, and if a state signal output from the controller 4 is a stable state signal, the optical measurement device 1 is in a usable state.

The system controller 104 interrupts continuous analysis being executed when the liquid chromatograph 102 is in a state in which analysis is not executable between start and end of continuous analysis of a plurality of analyses, and resumes the continuous analysis when the liquid chromatograph 102 returns to a state in which analysis is executable.

Figure 4:
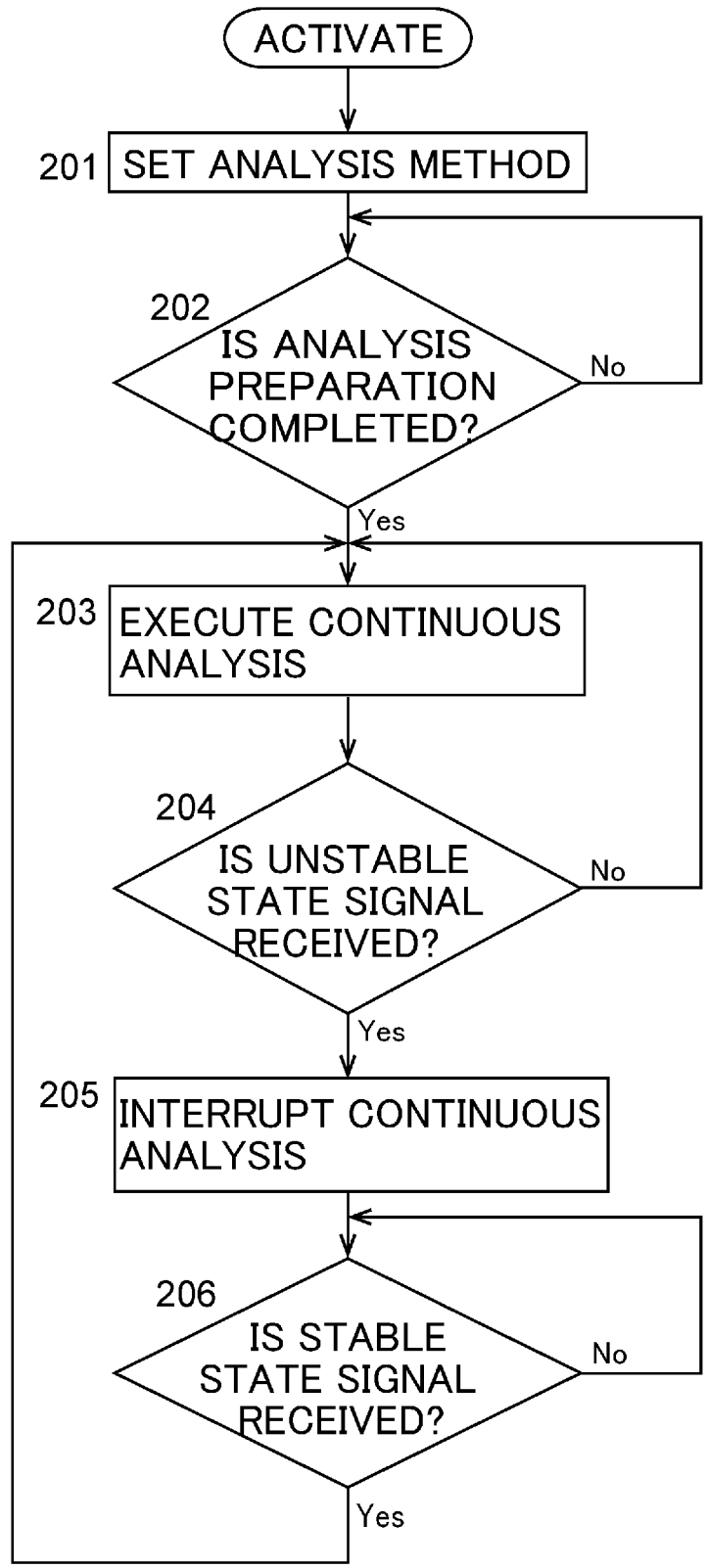
FIG. 4 is a flowchart illustrating an example of operation of the embodiment.

An example of operation of the liquid chromatograph system 100 will be described with reference to FIG. 3 and a flowchart of FIG. 4.

After activating the liquid chromatograph system 100, the system controller 104 sets each analysis method of a plurality of analyses based on input information by the user (Step 201). Each constituent of the liquid chromatograph 102 starts an analysis preparation operation such as temperature adjustment according to information given from the system controller 104, and analysis preparation is completed when analysis of all constituents is ready (Step 202). At this time, a stable state signal is output from the optical measurement device 1 to the system controller 104. After the above, the system controller 104 executes continuous analysis of a plurality of analyses based on an instruction to start analysis by the user (Step 203).

During execution of continuous analysis, for example, in a case where a light source to be used is changed in the optical measurement device 1, a temperature of the spectroscope 2 of the optical measurement device 1 becomes in an unstable state, and an unstable state signal is output to the system controller 104 (Step 204). When a state signal output from the optical measurement device 1 becomes an unstable state signal, the system controller 104 interrupts continuous analysis being executed (Step 205). After the above, when a state signal output from the optical measurement device 1 becomes a stable state signal again, the system controller 104 resumes the continuous analysis (Step 206).

The embodiment described above is merely an example of an embodiment of the optical measurement device and the liquid chromatograph system according to the present invention. The embodiment of the optical measurement device liquid chromatograph system according to the present invention is as described below.

An embodiment of the optical measurement device according to the present invention includes:
an optical part including a measurement cell, a light source part that emits light to be emitted to the measurement cell, a light receiving element that receives light from the measurement cell and outputs current according to intensity of received light, and a shutter that shields light to the light receiving element;
a storage part that stores a measured value of dark current of the light receiving element of the optical part;
a controller for controlling operation of the optical part; and
a calculator that performs calculation processing of obtaining a current value based on intensity of light received by the light receiving element by subtracting a measured value of the dark current stored in the storage part from a value of current output from the light receiving element during analysis.

The optical part includes a temperature control element for adjusting a temperature of the optical part,
the controller is configured to control the temperature control element so that the temperature of the optical part becomes a target temperature which is set in advance, and to execute, at least in a case where a measured value of the dark current at the target temperature is not stored in the storage part, measurement of the dark current by closing the shutter immediately after a transition from an unstable state to a stable state, the unstable state is a state in which a temperature of the optical part fluctuates, the stable state is a state in which the temperature of the optical part is stable at the target temperature,
the storage part is configured to store a measured value of the dark current acquired in the measurement, and
the calculator is configured to continuously use the same measured value of the dark current in the calculation processing while the stable state of a temperature of the optical part continues.

In an aspect [1] of the embodiment, the controller is configured to output a stable state signal indicating that the optical measurement device is in the stable state when the temperature of the optical part is in the stable state at the target temperature and a measured value of the dark current at the target temperature is stored in the storage part.

In an aspect [2] of the embodiment, the light source part includes a plurality of light sources, and the target temperature is determined according to a type of light source used. This aspect [2] can be combined with the above aspect [1].

In an aspect [3] of the embodiment, the controller is configured to omit measurement of the dark current in a case where a measured value of the dark current at the target temperature is already stored in the storage part after a transition of a temperature of the optical part from the unstable state to the stable state at the target temperature. In this manner, since measurement of dark current is not performed unless a target temperature of the optical part is changed, loss of analysis data at the beginning of analysis is prevented, and waiting time until analysis can be started can be shortened. This aspect [3] can be combined with the aspect [1] and/or the aspect [2].

In an aspect [4] of the embodiment, the controller is configured to determine that a temperature of the optical part makes a transition to a stable state at the target temperature when a state in which a temperature of the optical part is within a predetermined range including the target temperature continues for a predetermined period of time. This aspect [4] can be combined with the aspect [1], the aspect [2], and/or the aspect [3].

An embodiment of a liquid chromatograph system according to the present invention includes a liquid chromatograph including an optical measurement device, and a system controller that controls the liquid chromatograph.

The optical measurement device of the liquid chromatograph includes:
an optical part including a measurement cell, a light source part that emits light to be emitted to the measurement cell, a light receiving element that receives light out from the measurement cell and outputs current according to intensity of received light, and a shutter that shields light to the light receiving element;
a storage part that stores a measured value of dark current of the light receiving element of the optical part;

a controller for controlling operation of the optical part; and a calculator configured to perform calculation processing of obtaining a current value based on intensity of light received by the light receiving element by subtracting a measured value of the dark current stored in the storage part from a value of current output from the light receiving element during analysis, the optical part includes a temperature control element for adjusting a temperature of the optical part, the controller is configured to control the temperature control element so that a temperature of the optical part becomes a target temperature which is set in advance, and to execute measurement of the dark current by closing the shutter at least in a case where a measured value of the dark current at the target temperature is not stored in the storage part only immediately after a transition from an unstable state to a stable state, the unstable state is a state in which the temperature of the optical part fluctuates, and the stable state is a state in which the temperature of the optical part is at the target temperature, the storage part is configured to store a measured value of the dark current acquired in the measurement, the system controller is configured to set an analysis condition for each of a plurality of analyses, and to continuously execute a plurality of the analyses under the analysis condition set for each of a plurality of the analyses after measurement of the dark current in the optical measurement device is finished, and the calculator of the optical measurement device is configured to continuously use the same measured value of the dark current in the calculation processing as long as the stable state of a temperature of the optical part continues during execution of a plurality of the analyses.

In the aspect [1] of the embodiment of the liquid chromatograph system, the controller of the optical measurement device is configured to send an unstable state signal to the system controller when a temperature of the optical part makes a transition from the stable state to the unstable state during a plurality of the analyses, to execute measurement of the dark current at least in a case where a measured value of the dark current at the current target temperature is not stored in the storage part when the temperature of the optical part makes a transition from the unstable state to the stable state, and to send a stable state signal to the system controller after a measured value of the dark current at the current target temperature is in a state of being stored in the storage part, and the system controller is configured to interrupt a plurality of the analyses when receiving the unstable state signal from the controller while a plurality of the analyses are being executed, and resume a plurality of the analyses when receiving the stable state signal from the controller while a plurality of the analyses are being interrupted.

In the aspect [1] of the liquid chromatograph system, during the plurality of analyses, the controller is configured to send the stable state signal to the system controller immediately after the temperature of the optical part makes a transition from the unstable state to the stable state when a measured value of the dark current at the current target temperature is stored in the storage part at the time a temperature of the optical part makes a transition from the unstable state to the stable state.

DESCRIPTION OF REFERENCE SIGNS 1 optical measurement device
2 spectroscope (optical part)
4 controller
6 storage part
8 calculator
10 light source part
12 measurement cell
14 PDA (light receiving element)
16 lens
18 shutter
20 mirror
22 slit
24 grating
100 liquid chromatograph system
102 liquid chromatograph
104 system controller
106 liquid feeding pump
108 autosampler
110 column oven

What is claimed is:

1. An optical measurement device comprising:
an optical part including a measurement cell, a light source part that emits light to be emitted to the measurement cell, a light receiving element that receives light out from the measurement cell and outputs current according to intensity of received light, and a shutter that shields light to the light receiving element;
a storage part that stores a measured value of dark current of the light receiving element of the optical part;
a controller for controlling operation of the optical part; and
a calculator that performs calculation processing of obtaining a current value based on intensity of light received by the light receiving element by subtracting a measured value of the dark current stored in the storage part from a value of current output from the light receiving element during analysis,
wherein the optical part includes a temperature control element for adjusting a temperature of the optical part,
the controller is configured to control the temperature control element so that the temperature of the optical part becomes a target temperature which is set in advance, and to execute, at least in a case where a measured value of the dark current at the target temperature is not stored in the storage part, measurement of the dark current by closing the shutter immediately after a transition from an unstable state to a stable state, the unstable state is a state in which a temperature of the optical part fluctuates, the stable state is a state in which the temperature of the optical part is stable at the target temperature,
the storage part is configured to store a measured value of the dark current acquired in the measurement, and
the calculator is configured to continuously use a same measured value of the dark current in the calculation processing while the stable state of the temperature of the optical part continues.

2. The optical measurement device according to claim 1, wherein the controller is configured to output a stable state signal indicating that the optical measurement device is in the stable state when the temperature of the optical part is in the stable state at the target temperature and a measured value of the dark current at the target temperature is stored in the storage part.

3. The optical measurement device according to claim 1, wherein
the light source part includes a plurality of light sources, and the target temperature is determined according to a type of light source used.

4. The optical measurement device according to claim 1, wherein the controller is configured to omit measurement of the dark current in a case where a measured value of the dark current at the target temperature is already stored in the storage part after a transition of a temperature of the optical part from the unstable state to the stable state at the target temperature.

5. The optical measurement device according to claim 1, wherein the controller is configured to determine that a temperature of the optical part makes a transition to a stable state at the target temperature when a state in which the temperature of the optical part is within a predetermined range including the target temperature continues for a predetermined period of time.

6. A liquid chromatograph system comprising: a liquid chromatograph including an optical measurement device; and a system controller that controls the liquid chromatograph, wherein
the optical measurement device of the liquid chromatograph includes:
an optical part including a measurement cell, a light source part that emits light to be emitted to the measurement cell, a light receiving element that receives light out from the measurement cell and outputs current according to intensity of received light, and a shutter that shields light to the light receiving element;
a storage part that stores a measured value of dark current of the light receiving element of the optical part;
a controller for controlling operation of the optical part; and
a calculator configured to perform calculation processing of obtaining a current value based on intensity of light received by the light receiving element by subtracting a measured value of the dark current stored in the storage part from a value of current output from the light receiving element during analysis,
the optical part includes a temperature control element for adjusting a temperature of the optical part,
the controller is configured to control the temperature control element so that a temperature of the optical part becomes a target temperature which is set in advance, and to execute measurement of the dark current by closing the shutter only immediately after a transition from an unstable state to a stable state,
the unstable state is a state in which the temperature of the optical part fluctuates, and the stable state is a state in which the temperature of the optical part is at the target temperature,
the storage part stores a measured value of the dark current acquired in the measurement,
the system controller is configured to set an analysis condition for each of a plurality of analyses, and to continuously execute the plurality of analyses under the analysis condition set for each of the plurality of analyses after measurement of the dark current in the optical measurement device is finished, and
the calculator of the optical measurement device is configured to continuously use a same measured value of the dark current in the calculation processing as long as the stable state of a temperature of the optical part continues during execution of the plurality of analyses.

7. The liquid chromatograph system according to claim 6, wherein
the controller of the optical measurement device is configured to send an unstable state signal to the system controller when a temperature of the optical part makes a transition from the stable state to the unstable state during the plurality of analyses, to execute measurement of the dark current at least in a case where a measured value of the dark current at the current target temperature is not stored in the storage part when the temperature of the optical part makes a transition from the unstable state to the stable state, and to send a stable state signal to the system controller after a measured value of the dark current at the current target temperature is in a state of being stored in the storage part, and
the system controller is configured to interrupt the plurality of analyses when receiving the unstable state signal from the controller while the plurality of analyses are being executed, and resume the plurality of analyses when receiving the stable state signal from the controller while the plurality of analyses are being interrupted.

8. The liquid chromatograph system according to claim 7, wherein during the plurality of analyses, the controller is configured to send the stable state signal to the system controller immediately after the temperature of the optical part makes a transition from the unstable state to the stable state when a measured value of the dark current at the current target temperature is stored in the storage part at time the temperature of the optical part makes a transition from the unstable state to the stable state.

* * * * *